United States Patent
Friederich et al.

(10) Patent No.: US 7,503,536 B2
(45) Date of Patent: Mar. 17, 2009

(54) UNIVERSAL PROJECTOR MOUNT

(75) Inventors: Steven Friederich, Bloomington, MN (US); Jay Dittmer, Prior Lake, MN (US)

(73) Assignee: Milestone AV Technologies LLC, Savage, MN (US)

( * ) Notice: Subject to any disclaimer, the term of this patent is extended or adjusted under 35 U.S.C. 154(b) by 394 days.

(21) Appl. No.: 11/040,811

(22) Filed: Jan. 21, 2005

(65) Prior Publication Data
US 2005/0161575 A1    Jul. 28, 2005

Related U.S. Application Data

(60) Provisional application No. 60/538,634, filed on Jan. 23, 2004, provisional application No. 60/637,710, filed on Dec. 21, 2004.

(51) Int. Cl.
*B24F 13/00* (2006.01)
(52) U.S. Cl. .................................. 248/324; 248/343
(58) Field of Classification Search ................ 248/519, 248/324, 326, 329, 920, 279.1, 317, 343, 248/344, 346.06, 349.1, 523, 917–919
See application file for complete search history.

(56) References Cited

U.S. PATENT DOCUMENTS

| 4,964,606 | A |  | 10/1990 | Beam et al. |
| 4,993,676 | A |  | 2/1991 | Fitts et al. |
| 5,009,384 | A |  | 4/1991 | Gerke et al. |
| 5,383,641 | A |  | 1/1995 | Bergetz |
| 5,490,655 | A |  | 2/1996 | Bates |
| 5,551,658 | A |  | 9/1996 | Dittmer |
| 5,621,846 | A |  | 4/1997 | Smith et al. |
| 5,730,410 | A |  | 3/1998 | Archamboult et al. |
| 5,938,161 | A | * | 8/1999 | Takeuchi et al. ............ 248/343 |
| 5,944,896 | A |  | 8/1999 | Landesman et al. |
| 5,946,404 | A |  | 8/1999 | Bakshi et al. |
| 6,042,068 | A | * | 3/2000 | Tcherny ................. 248/221.11 |
| 6,527,238 | B2 |  | 3/2003 | Shental et al. |
| 6,708,940 | B2 | * | 3/2004 | Ligertwood ................. 248/324 |
| D514,612 | S | * | 2/2006 | Boele ......................... D16/235 |
| D540,367 | S | * | 4/2007 | Dittmer ..................... D16/235 |
| D560,669 | S | * | 1/2008 | Muday et al. .............. D14/451 |
| 7,317,611 | B2 |  | 1/2008 | Dittmer |
| 2006/0186301 | A1 | * | 8/2006 | Dozier et al. ............... 248/371 |
| 2007/0034764 | A1 | * | 2/2007 | Dittmer et al. ............. 248/324 |
| 2008/0061200 | A1 | * | 3/2008 | Bouissiere .................. 248/343 |

OTHER PUBLICATIONS

Peerless Industries, Inc., Peerless Series Projector Mount PRS-UNV issued Jan. 26, 2004 Sheet No. 0555-9821-3.*
Chief Manufacturing Inc., Full-Line Product Guide 2003, Presentation Support Solutions, Jan. 2003, 10 pages.

* cited by examiner

*Primary Examiner*—J. Allen Shriver
*Assistant Examiner*—Tan Le
(74) *Attorney, Agent, or Firm*—Patterson, Thuente, Skaar & Christensen, PA

(57) ABSTRACT

A universal projector mount that can be fitted to mount projectors of a variety of different makes and models. The invention includes multiple adjustable arms coupled with an interface plate that is, in turn, attached to a standard projector mount on the fixed structure from which the projector is supported. The arms are adjustable radially and longitudinally to virtually any position so as to accommodate various fastener or fastener receiving locations on different makes and models of projectors.

8 Claims, 8 Drawing Sheets

UNIVERSAL PROJECTOR MOUNT

RELATED APPLICATIONS

This application claims the benefit of U.S. Provisional patent application 60/538,634 filed Jan. 23, 2004 and 60/637,710 filed Dec. 21, 2004 both entitled Universal Projector Mount. Both of the above referenced applications are incorporated herein by in their entirety by reference.

FIELD OF THE INVENTION

The present invention relates generally to mounts for projectors. More particularly, the present invention relates to a universal mount for a projector.

BACKGROUND OF THE INVENTION

Visual projection systems are commonly used for entertainment and displaying, and presenting visual information to groups of people. Such visual projection systems typically include a projector unit and a projection screen.

In spaces such as classrooms, conference rooms, and public assembly halls, where the space is often used for presentations, and in home entertainment rooms, it is common that the projector unit be installed as a more or less permanent fixture in the space. Often, the projector will be suspended from an overhead structure, such as a building floor/ceiling assembly or roof, in order to give the projector an unobstructed projection path and to protect it from damage by inadvertent contact. It is generally desirable that the mount be adjustable over a wide range of positions to enable proper aiming and focusing of the projector.

Projectors, particularly LCD, CRT, and DRP projectors designed for frequent use in a setting such as described above are quite expensive. In addition, the spaces where the projector is installed may be left unsecured for periods of time or left unattended. Consequently, a problem is that projector units are attractive targets for theft, vandalism and other tampering.

There are many different makes and models of mountable projectors commercially available today. There is no single standard for mounting attachments in the industry, and consequently, the mounting attachment fixture configurations differ widely between manufacturers. A consequent problem with available mounting devices to date has been that mounts are not generally interchangeable between projector makes, and therefore, mounts must be made in a large variety of separate configurations. The industry would benefit from a single universal projector mount that can be fitted to mount projectors of a variety of different makes and models.

SUMMARY OF THE INVENTION

The present invention is directed to a universal projector mount that meets the need of the industry for a single universal projector mount that can be fitted to mount projectors of a variety of different makes and models. According to an embodiment of the invention, a plurality of adjustable arms are operably coupled with an interface plate that is in turn attached to a standard projector mount on the fixed structure from which the projector will be hung. The arms are adjustable radially and longitudinally to virtually any position so as to accommodate various fastener or fastener receiving locations on different makes and models of projectors.

DETAILED DESCRIPTION OF THE INVENTION

Figure 1:
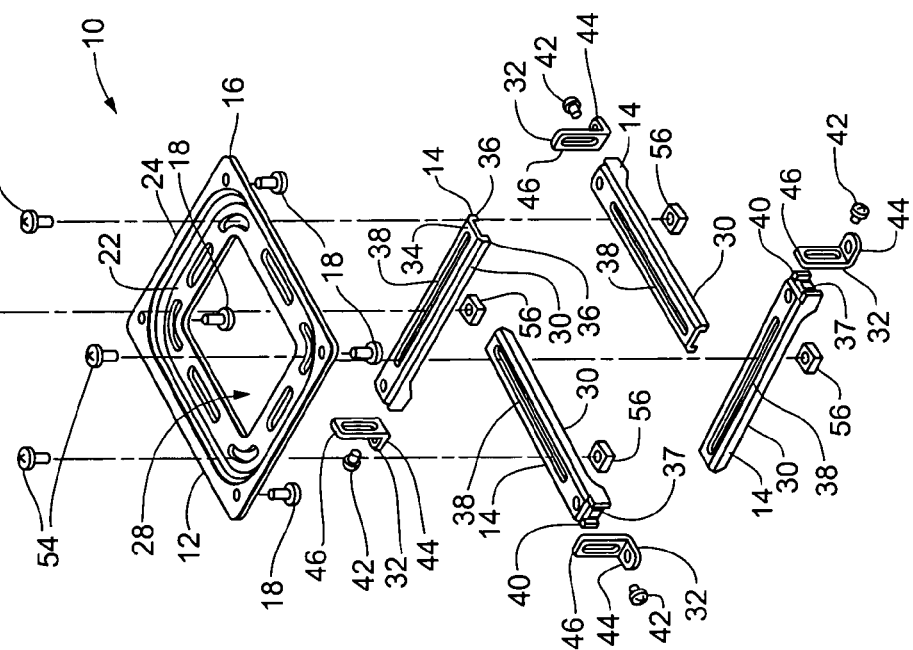
FIG. 1 is a perspective view of a universal projector mount according to an embodiment of the present invention.
Figure 2:
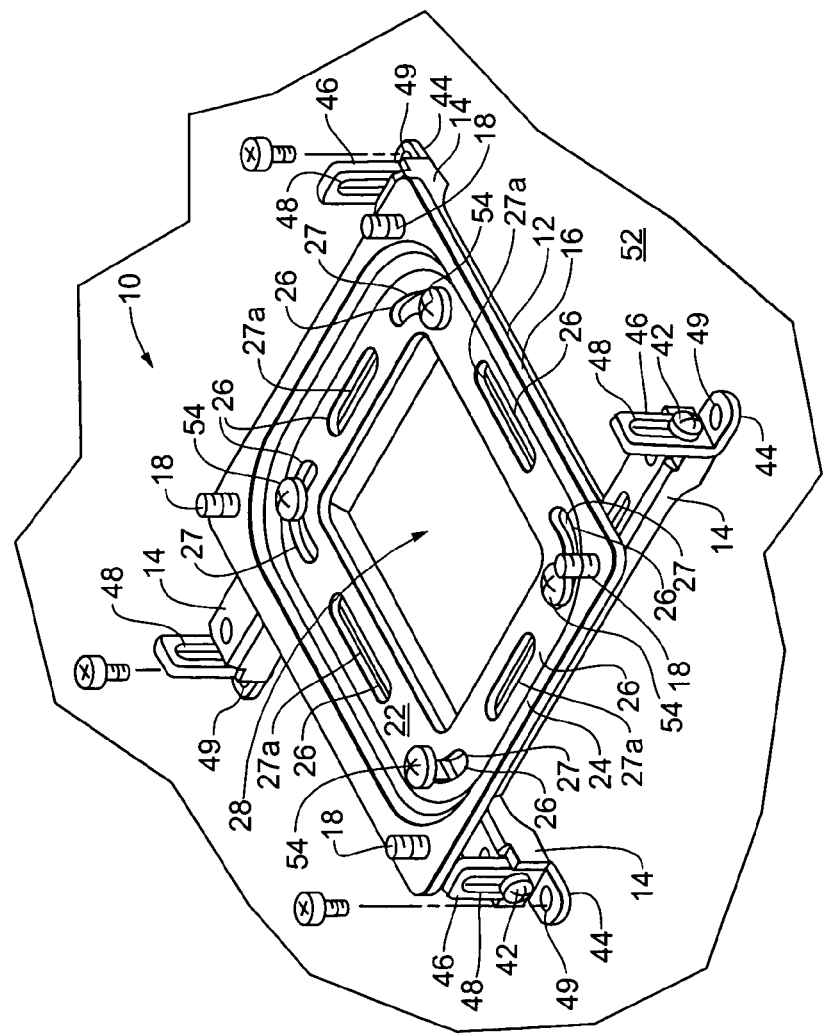
FIG. 2 is an exploded view of the universal projector mount of FIG. 1.
Figure 3:
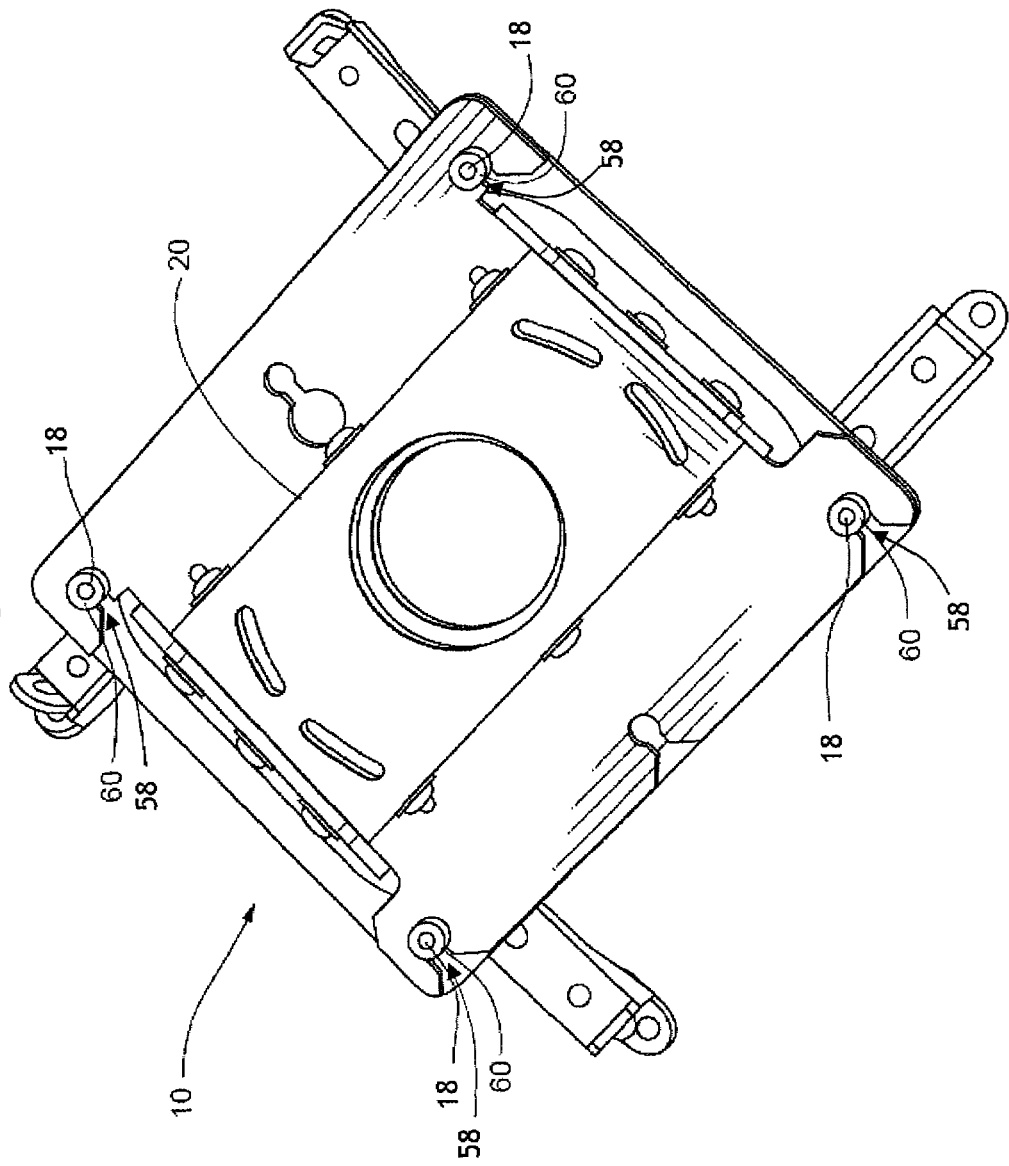
FIG. 3 is a perspective view of the universal projector mount of FIG. 1 with an overhead projector mount attached thereto.
Figure 4:
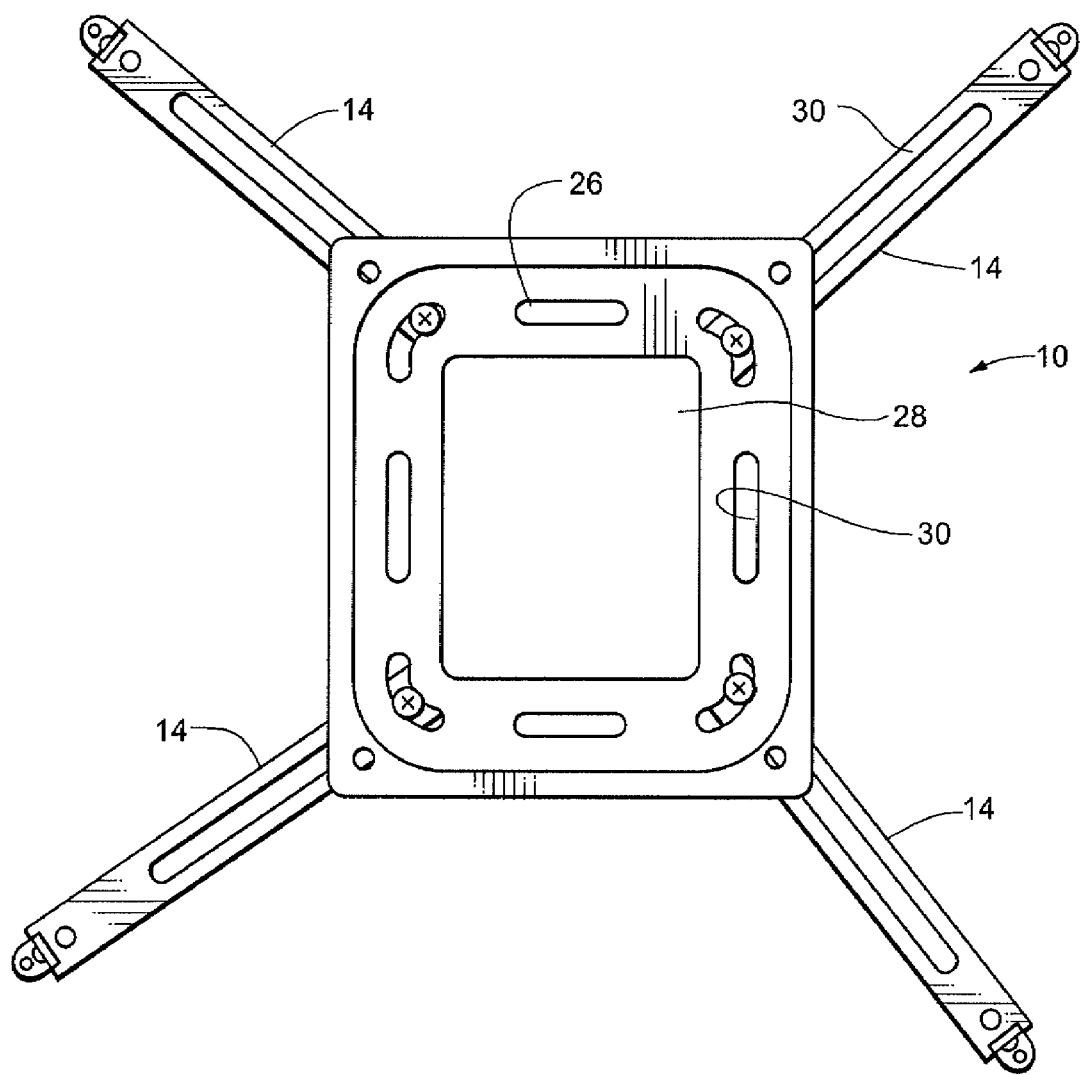
FIG. 4 is a perspective view of the universal projector mount of FIG. 1 with the arms positioned in an extended position.
Figure 5:
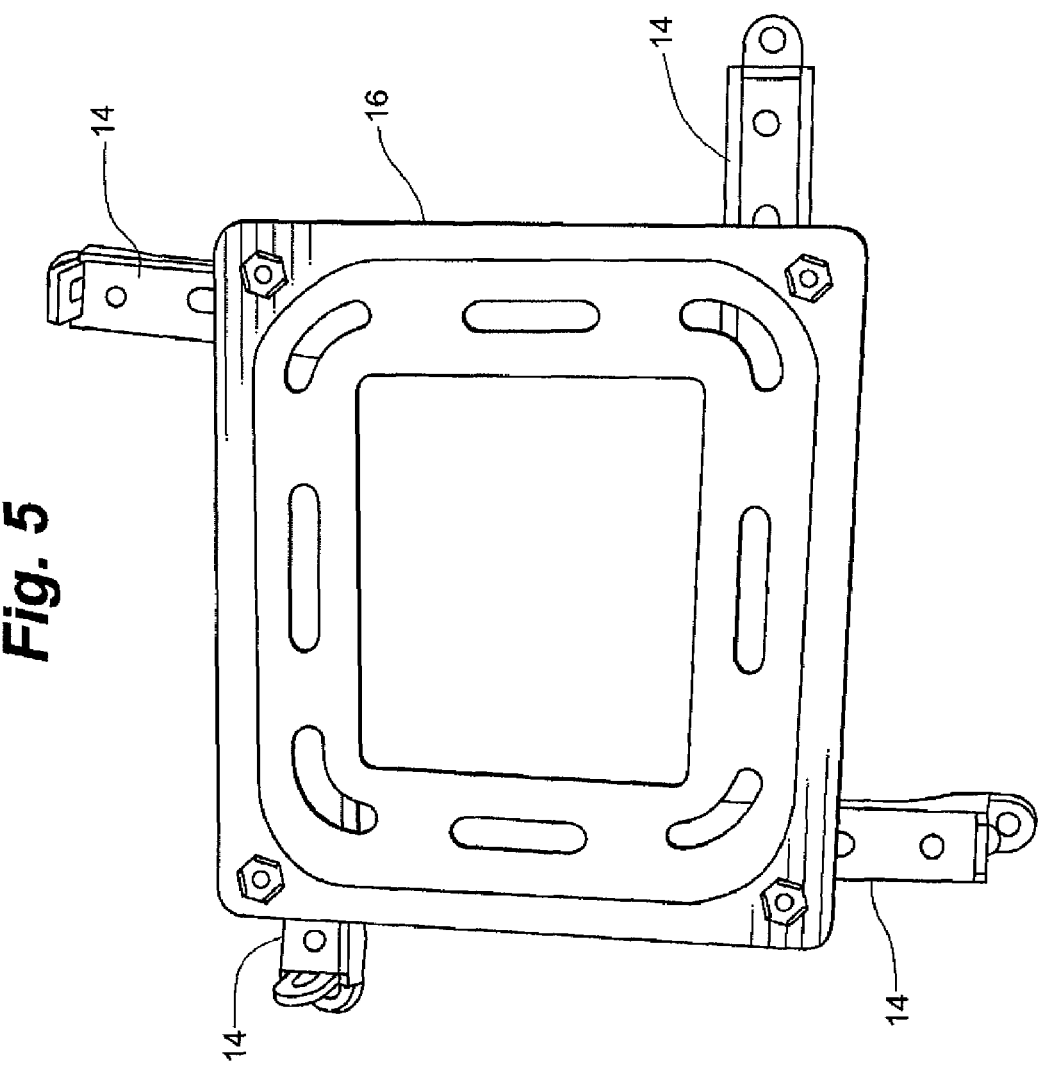
FIG. 5 is another perspective view of the universal projector mount of FIG. 1.

The universal projector mount 10 of the present invention, as depicted in FIGS. 1 and 2, generally includes a mount interface 12 and arms 14. Mount interface 12 generally includes central member 16 having studs 18 for detachably receiving an overhead projector mount 20. Overhead projector mount 20 is known in the art and more fully described in co-pending U.S. Utility patent No. 7,156,359, commonly owned by the owners of the present invention and hereby incorporated herein in its entirety by reference.

Central member 16 has a recessed portion 22 recessed from peripheral margin 24. Elongate slots 26 are defined in recessed portion 22 and arranged just inside peripheral margin 24. Elongate slots 26 include curved slots 27 at the corners and generally straight slots 27a along the sides. Central aperture 28 may be provided if desired to lighten the structure.

Each arm 14 includes elongate beam portion 30 and foot 32. Elongate beam portion 30 may have a generally u-shaped cross section with a web 34, sidewalls 36, and end wall 37. Web 34 defines one or more slots 38 along its longitudinal axis. End wall 37 has an aperture 40 defined therein, which may be threaded for receiving a fastener 42. Foot 32 may be generally L-shaped, with interface flange portion 44 and projector attachment ear 46. Interface flange portion 44 defines slot 48, through which fastener 42 is received to secure foot 32 to beam portion 30. Projector attachment ear 46 has an aperture 49 defined therein for receiving a fastener 50 to attach foot 32 to a projector 52. Each arm 14 is fastened to central member 16 with a threaded fastener 54 extending through one of elongate slots 26 in central member 16 and slot 38 into threaded nut 56.

To attach universal projector mount 10 to a projector 52, each fastener 54 is loosened, enabling fastener 54 to slide within the elongate slot 26 through which it extends. Further, slot 38 enables arm 14 to slide radially and rotate relative to central member 16. Each arm 14 may be positioned so that aperture 49 of attachment ear 46 corresponds with an attachment fixture on projector 52. Once arm 14 is properly positioned, fastener 54 is tightened to secure arm 14 in the desired position and foot 32 is fastened to the projector 52 with a fastener 50 through aperture 49. If needed, each fastener 42 may be loosened, enabling foot 32 to slide vertically in order to adjust the spacing of central member 16 from projector 52. Once in the desired position, fastener 42 may be tightened to secure foot 32 in position.

With universal projector mount 10 attached to projector 52, the overhead projector mount 20 may be attached to central member 16. In the depicted embodiment, mount 10 has notches 58 corresponding to studs 18. Each stud 18 is received in a notch 58 and the overhead projector mount is secured in position with knurled nut 60.

It will be appreciated that each arm 14 may be adjusted so that aperture 49 may be positioned in virtually any position inside a radius defined by the length of arm 14 around fastener 54. Also, each arm 14 may be attached to central member 16 with the fastener 54 through any of elongate slots 26. Hence, mount 10 is adjustable to a virtually unlimited number of configurations to correspond with nearly any geometric arrangement of fastener receiving locations on a given projector 52. It will also be appreciated that, although four arms 14 are depicted in this application, any other number of arms 14, from two to eight or more may be used within the scope of the present invention.

Another embodiment of universal projector mount 10 is depicted in FIGS. 6-12. The universal projector mount 10, as depicted in FIGS. 6-12, generally includes base plate 66, universal joint portion 68, and mount interface 70.

Figure 6:
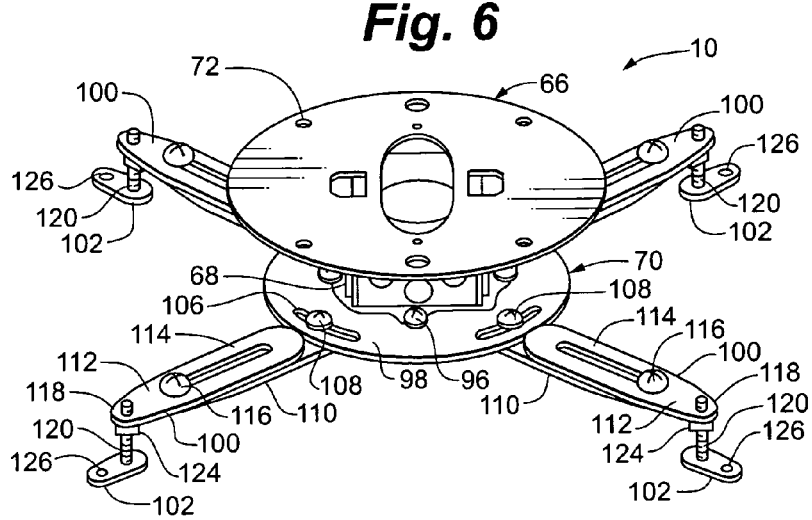
FIG. 6 is a perspective view of another universal projector mount according to the present invention.
Figure 7:
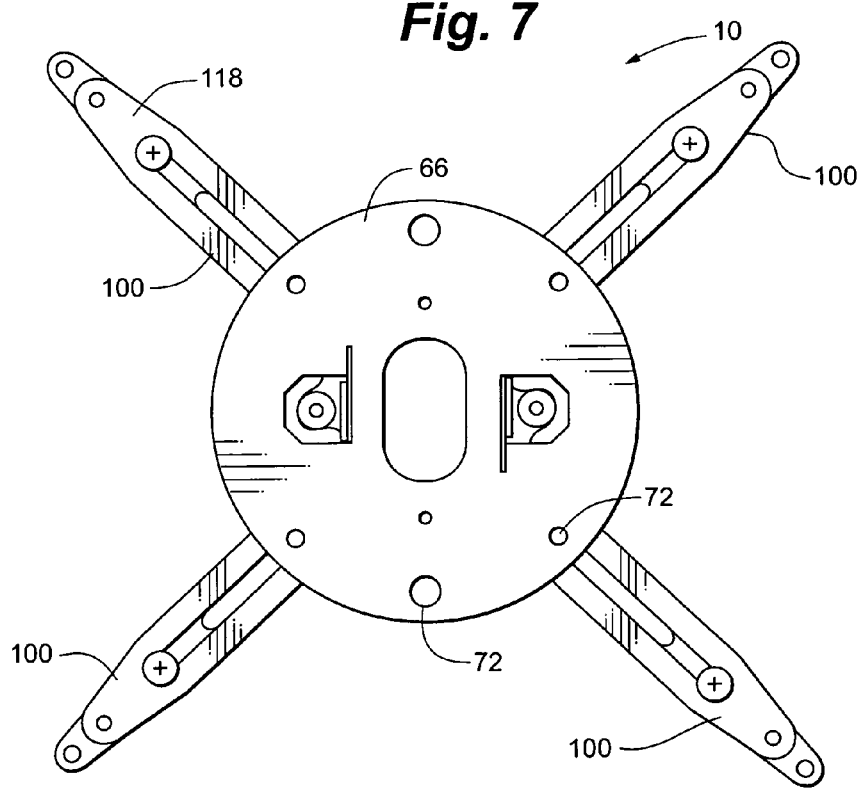
FIG. 7 is a rear elevation view of the universal projector mount of FIG. 6.
Figure 8:
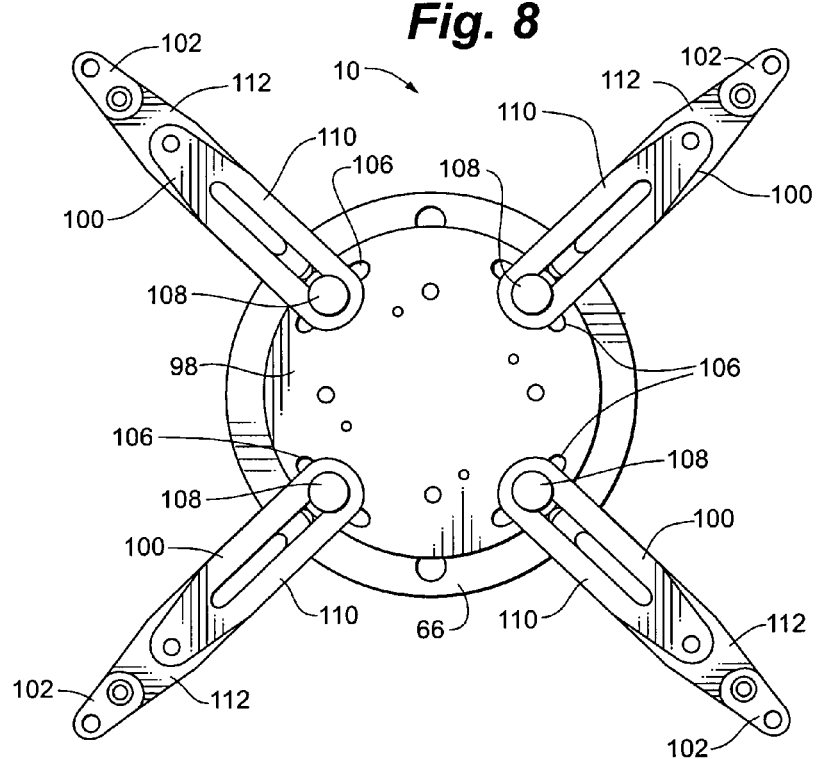
FIG. 8 is a front elevation view of the universal projector mount of FIG. 6.

Base plate 66 may be substantially flat as depicted here or differently shaped to adapt to mounting to a variety of surfaces. Base plate 66 has a plurality of apertures 72 at the periphery thereof adapted to accept fasteners for securing base plate 66 to a surface of a supporting structure. Base plate 66 is operably attached to universal joint portion 68. As can be seen in FIGS. 6 and 7, though not depicted here base plate 66 may be connected to universal joint portion 68 by large threaded mount 74. The term base plate 66 is defined for the purposes of this application to encompass portions of overhead projector mount 20 used for securing overhead projector mount 20 to a structure. Base plate 66 may include structures such as struts and tubes that may be used to support universal projector mount at a distance from a building structure.

Figure 9:
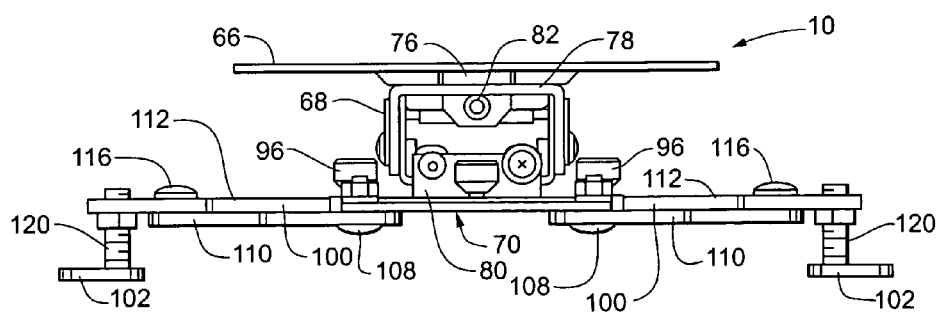
FIG. 9 is a top plan view of the universal projector mount of FIG. 6.
Figure 10:
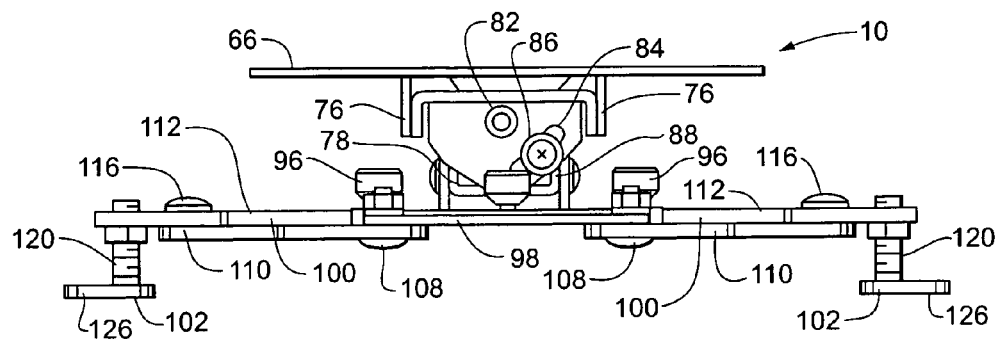
FIG. 10 is a side elevation view of the universal projector mount of FIG. 6.

Referring to FIGS. 9 and 10, universal joint portion 68 generally includes base plate yoke 76, cross portion 78, and mount interface yoke 80. Base plate yoke 76 is attached to cross portion 78 at pivot 82 to allow rotation of base plate yoke 76 and, consequently, base plate 66 about a first axis. Base plate yoke 76 defines curved slot 84 through which fastener 86 may be inserted and through which fastener 86 may be tightened to secure base plate yoke 76 rotationally to cross portion 78 thus locking base plate yoke 76 in position relative to cross portion 78.

Mounting interface yoke 80 is pivotably secured to cross portion 78 at pivot 88. Mounting interface yoke 80 may be rotationally secured to cross portion 78 relative to pivot 88 by locking fastener 90 thus locking mount interface yoke 80 to cross portion 78 in a specific orientation about a second axis which is substantially perpendicular to the first axis.

Figure 11:
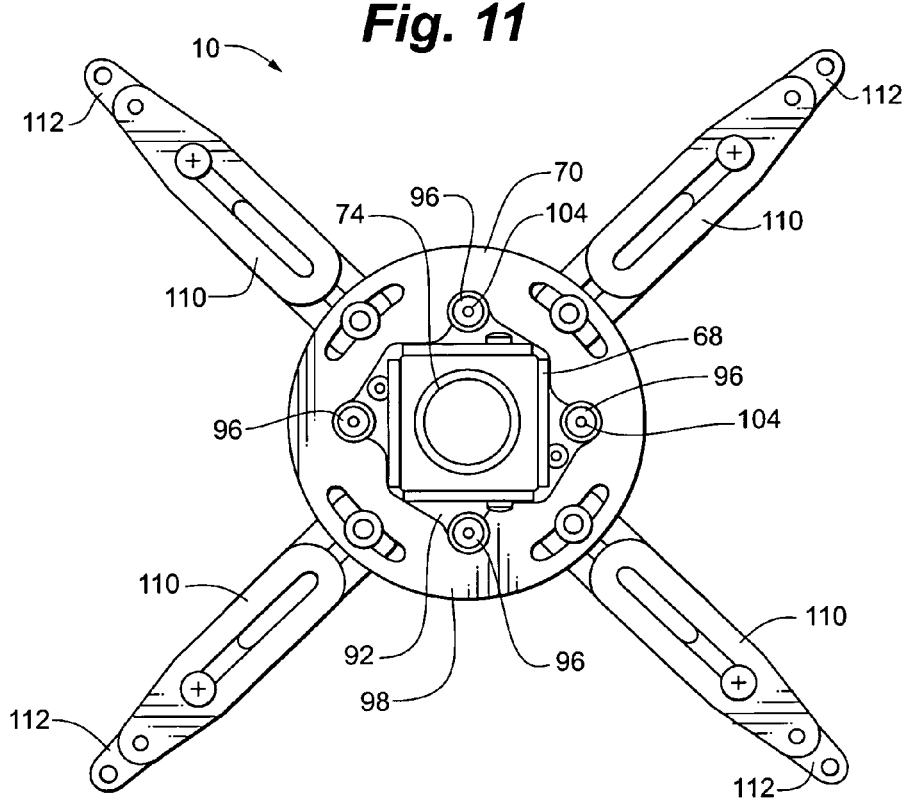
FIG. 11 is a perspective view of the universal projector mount of FIG. 6 with parts removed for clarity.
Figure 12:
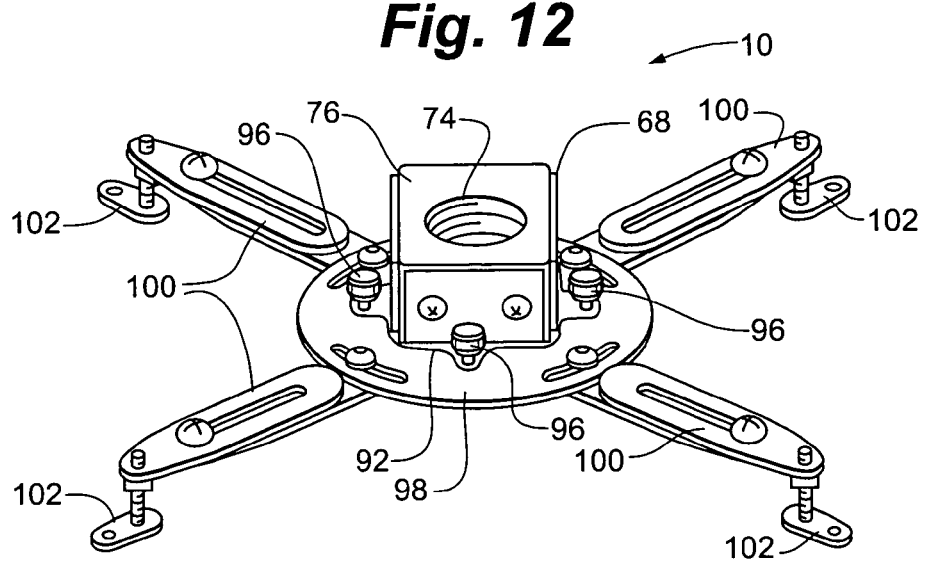
FIG. 12 is a rear elevation view of the universal projector mount of FIG. 6 with parts removed.

Referring particularly to FIGS. 11 and 12, mount interface yoke 80 further includes attachment plate 92. Attachment plate 92 defines notches 94 which are adapted to interface with knurled nut 96 to secure attachment plate 92 and thus mount interface yoke 80 to mount interface 70. The term base plate 66 is defined for the purposes of this application to encompass portions of overhead projector mount 20.

Mount interface 70 generally includes central member 98, arms 100, and attachment ears 102.

Central member 98 supports studs 104 and is pierced by circumferential slots 106 near its periphery. Studs 104 are located to align with notches 94 of attachment plate 92. Thus studs 104 can receive knurled nut 96 to secure attachment plate 92 to central member 98.

Circumferential slots 106 may number 4, but his number should not be considered limiting.

Arms 100 are secured to central member 98 by arm fastener 108. Arm fastener 108 may be, for example, a screw or bolt. Arm fastener 108 may be secured anywhere along the length of circumferential slots 106.

Arms 100 include first section 110, and second section 112. First section 110 and second section 112 are telescopically slidable relative to one another so that the length of arms 100 may be adjusted. For example, second section 112 may include arm slot 114 adapted to slideably engage with fastener 116 which is secured to first section 110. Fastener 116 may be tightened to secure first section 110 to second section 112 at a desired degree of telescopic elongation to fix the length of arm 100.

Attachment ears 102 are supported at distal end 118 of arms 100 via adjustment stud 120. Adjustment stud 120 may be screwed into threaded aperture 122 at the distal end 118 of arm 100. Lock nut 124 may be utilized on adjustment stud 120 to secure attachment ears 102 at a desired orientation. Apertures 126 pierce attachment ears 102. Apertures 126 are adapted to receive fasteners to secure attachment ears 102 to a projector (not shown).

In operation base plate 66 may be secured to any convenient surface to which it is desired to secure universal projector mount 10. After base plate 66 is secured, universal joint portion 68 may be secured to base plate 66. Mount interface 70 may be secured to projector or any other device that it is desired to mount and then mount interface 70 is secured to universal joint portion 68. Universal joint portion 68 may then be adjusted to align the projector to aim it as desired.

Mount interface 70 may be secured to universal joint portion 68 via attachment plate 92. Attachment plate 92 is positioned so that notches 94 engage to studs 104 and knurled nuts 96 may then be tightened to secure mount interface 70 to universal joint portion 68.

Universal joint portion 68 may be moved to a plurality of positions by adjusting base plate yoke 76 relative to cross portion 78 and mount interface yoke 80 relative to cross portion 78. Once a desired position is achieved, fastener 86 and locking fastener 90 may be tightened to secure universal joint portion 58 in a desired orientation.

When attaching a projector to mount interface 70, arms 100 may be adjusted positionally within circumferential slots 106 to any desired location. In addition, arms 100 may be rotated relative to circumferential slots 106 to any desired angle. First section 110 and second section 112 may be adjusted telescopically relative to each other to adjust arm 100 to any necessary length. Attachment ears 102 may be adjusted, both angularly relative to the distal end 118 of arms 100, and in a degree of offset between the peripheral ends of arms 100 and attachment ears 102 by screwing adjustment stud 120 into or out of threaded aperture 122. Once a desired adjustment is achieved, lock nut 124 may be tightened on adjustment stud 120 to lock adjustment ears 102 relative to the peripheral end of arms 100.

Thus it will be appreciated that by making these multiple adjustments, apertures 126 on attachment ears 102 may be adjusted to align with virtually any arrangement of attachment positions on any projector that may be presented.

A person of ordinary skill in the art will appreciate that the concepts of the present invention can be modified to incorporate one or more locks that prevent the projector from being detached from the universal projector mount 10 and/or that prevent the orientation of the projector from being changed.

It is contemplated that features disclosed in this application, as well as those described in the above applications incorporated by reference, can be mixed and matched to suit particular circumstances. Various other modifications and changes will be apparent to those of ordinary skill.

What is claimed is:

1. A universal projector mount for mounting a projector to a ceiling of a structure, comprising a mount interface assembly including a central member and a plurality of arm assemblies, the central member presenting a periphery and defining a plurality of spaced apart elongate slots adjacent the periphery, the slots oriented substantially parallel to the periphery, each arm assembly including an arm body and an attachment member, the arm body presenting a longitudinal axis and a pair of opposing ends, the arm body defining at least one elongate slot oriented along the longitudinal axis, the attachment member adapted to attach to the projector and operably coupled to the arm body at one of the opposing ends such that the attachment member is selectively shiftable in a vertical direction relative to the arm body, the arm body of each arm assembly operably coupled to the central member with a fastener extending through one of the elongate slots of the central member and the at least one elongate slot of the arm body such that the arm assembly is pivotably shiftable in a horizontal plane relative to the central member and the arm assembly is horizontally shiftable relative to the central member by sliding the fastener in the elongate slot of the central member and by sliding the fastener in the at least one slot of the arm body, the universal projector mount further comprising structure operably coupled to the mount interface assembly for attaching the mount interface assembly to the ceiling of the structure.

2. The universal projector mount of claim 1, wherein the structure for attaching the mount interface assembly to the ceiling of the structure includes a base plate.

3. The universal projector mount of claim 1, wherein the central member is generally square in shape.

4. The universal projector mount of claim 1, wherein the structure for attaching the mount interface assembly to the ceiling of the structure is attached to the central member with a plurality of fasteners.

5. The universal projector mount of claim 1, wherein each attachment member comprises a generally L-shaped bracket having a vertically oriented portion and a horizontally oriented portion, wherein the vertically oriented portion defines an elongate aperture and the horizontally oriented portion defines an aperture, and wherein the vertically oriented portion is attached to the arm body with a fastener extending though the elongate aperture such that the fastener is slidably shiftable in the elongate aperture to enable the selective vertical shifting of the attachment member relative to the arm body.

6. The universal projector mount of claim 1, wherein at least one of the elongate slots adjacent the periphery of the central member is curved.

7. The universal projector mount of claim 1, wherein at least one of the elongate slots adjacent the periphery of the central member is straight.

8. The universal projector mount of claim 1, wherein the central member defines a central aperture therethrough.

\* \* \* \* \*